United States Patent [19]

Nicholson

[11] 4,319,758
[45] Mar. 16, 1982

[54] RING SEAL

[76] Inventor: Terence P. Nicholson, Calf Hall, Muggleswick, Derwentside, Co. Durham, England

[21] Appl. No.: 101,198

[22] Filed: Dec. 7, 1979

[30] Foreign Application Priority Data

Jan. 3, 1979 [GB] United Kingdom ............... 00153/79

[51] Int. Cl.³ .............................................. F16J 15/08
[52] U.S. Cl. ..................................... 277/205; 277/236
[58] Field of Search ............ 277/236, 237 R, 138-140, 277/151, 160, 158, 200, 205, 206 R

[56] References Cited

U.S. PATENT DOCUMENTS

| | | | |
|---|---|---|---|
| 2,569,778 | 10/1951 | Phillips | 277/200 |
| 3,163,431 | 12/1964 | Tanner | 277/206 |
| 3,180,662 | 4/1965 | Parlasca et al. | 277/205 X |
| 3,272,521 | 9/1966 | McNenny | 277/205 |
| 3,588,131 | 6/1971 | Nicholson | 277/206 R |
| 3,601,415 | 8/1971 | Bond | 277/140 |
| 3,624,342 | 11/1971 | Hoffman | 277/205 X |
| 3,713,660 | 1/1973 | Luthe | 277/206 R |
| 3,751,048 | 8/1973 | Rode | 277/200 |
| 3,758,123 | 9/1973 | Ksieski | 277/206 |

FOREIGN PATENT DOCUMENTS

| | | | |
|---|---|---|---|
| 614140 | 6/1935 | Fed. Rep. of Germany | 277/206 |
| 683333 | 2/1930 | France | 277/206 |
| 1424864 | 12/1965 | France | 277/206 |

OTHER PUBLICATIONS

Parker Seal Company, Pamphlet No. V5870, issued Mar. 1969, 20 pp. including inside and outside of both covers.

Primary Examiner—Robert S. Ward, Jr.

[57] ABSTRACT

A sealing ring comprises a body of revolution about a central axis having in radial cross-section an omega ($v$) shape including an arcuate central segment and terminal segments which extend laterally (generally parallel to the central axis) from the opposed ends of the arcuate central segment to a location beyond its peripheral extremities to provide annular sealing edges.

4 Claims, 10 Drawing Figures

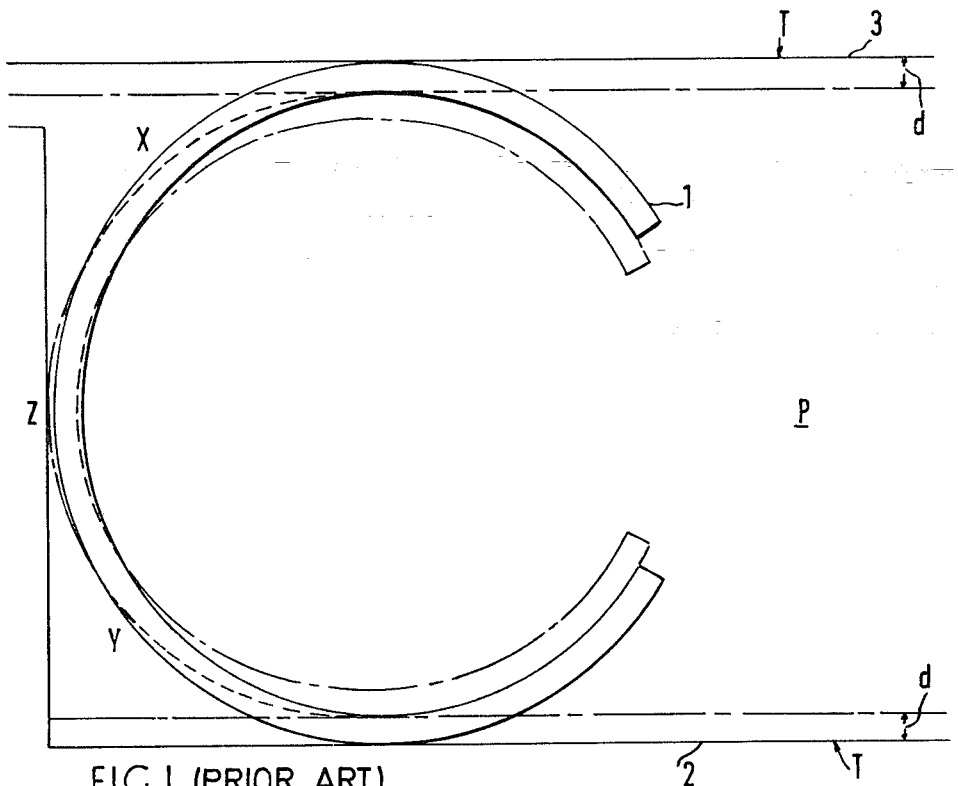
FIG.I. (PRIOR ART)
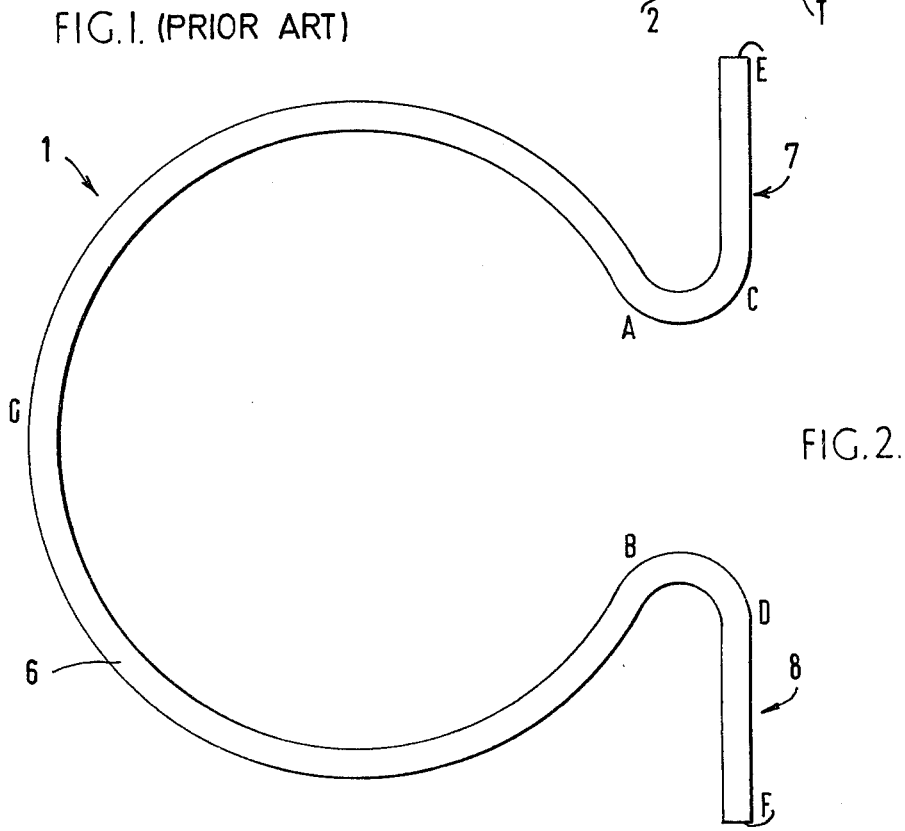
FIG.2.

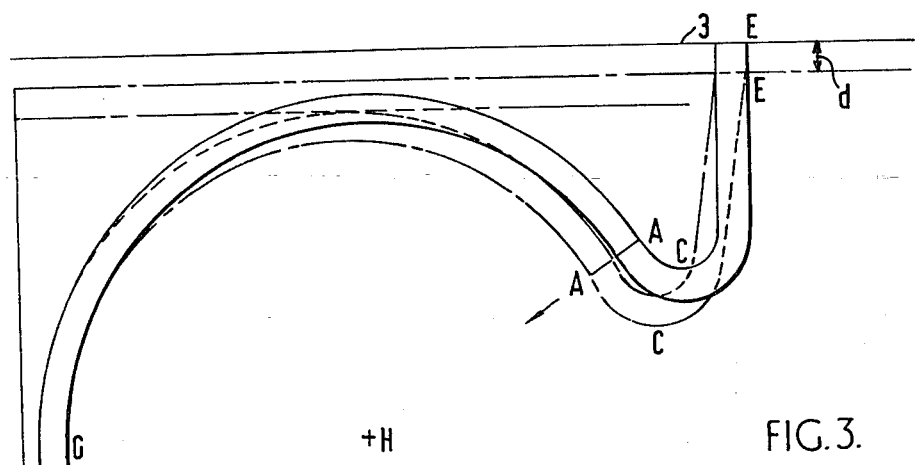
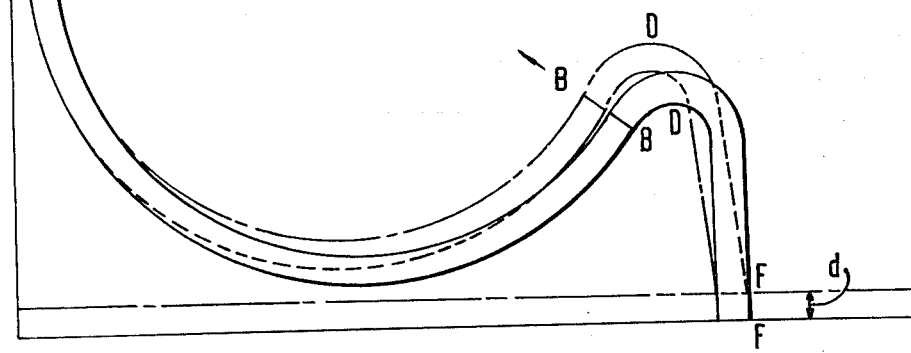
FIG. 3.
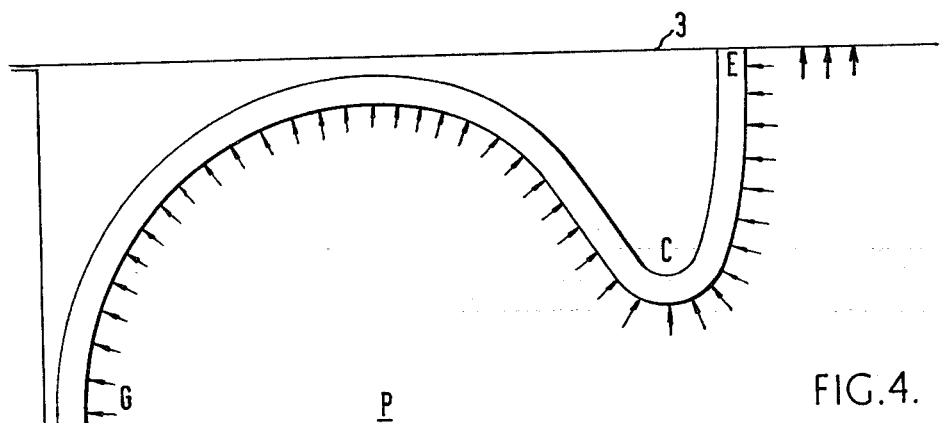
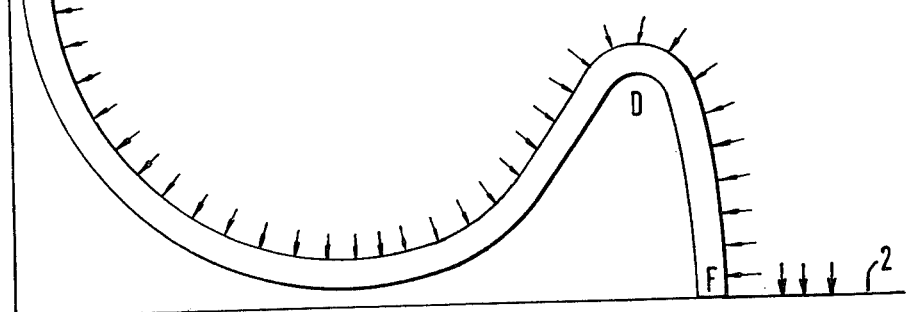
FIG. 4.

RING SEAL

BACKGROUND OF THE INVENTION

The present invention relates to sealing rings or sealing washers for interposition between generally parallel opposed surfaces. The sealing ring of the present invention is particularly effective when used to seal the space or joint between metal surfaces and when the ring seal itself is formed of metal. One conventional and extensively used sealing ring for this purpose is hollow and of C-shaped radial cross-section. It, however, has the disadvantage that in certain circumstances, for instance when used in conjunction with very badly machined surfaces or when subjected for some reason to lateral restraint its effective resilience becomes greatly reduced or even disappears.

Another form of sealing ring which has been extensively used may be regarded as being of modified C-shaped radial cross-section since the ends of the C are extended radially outwards in a divergent fashion and are intended to make contact with the surfaces which are to be sealed. However, this form of sealing ring also is unsatisfactory when used in conjunction with very badly machined surfaces.

It is, therefore, an object of the invention to provide a sealing ring which is effective for the sealing of the space or joint between roughly machined surfaces.

It is another object of the invention to provide a sealing ring made of metal which will effectively seal the joint between roughly machined metal surfaces.

It is still another object of the invention to provide a sealing ring capable of developing a counter-pressure which serves to enhance the sealing between terminal extensions of the sealing ring and the joint between machined generally parallel surfaces.

Other objects and advantages of the invention will become readily apparent to persons versed in the art to which the invention pertains from the ensuing description.

SUMMARY OF THE INVENTION

In accordance with the invention there is provided a sealing ring comprising a body of revolution about a central axis which in radial cross-section has a capital omega ($\omega$) shape including an arcuate central segment and terminal segments which extend laterally from the opposed ends of the arcuate central segment to a location beyond the peripheral extremities of such arcuate central segment. The oppositely directed terminal segments thereby provide concentric annular sealing edges and are integral with an arcuate central segment which is resilient and thereby deformable so as to exert a counter-pressure through the terminal segments when the sealing edges thereof are engaged by the opposed surfaces to be sealed and the sealing ring is subjected to pressure within the joint.

BRIEF DESCRIPTION OF THE DRAWINGS

In order that the invention may be more fully comprehended, it will now be described, by way of example, with reference to the accompanying drawings in which:

FIG. 1 is a fragmentary diagrammatic radial cross-sectional view illustrating the mode of behavior of a conventional C-shaped sealing ring within a joint when subjected to compression;

FIG. 2 is a fragmentary radial cross-sectional view of a sealing ring according to the invention;

FIG. 3 is a diagrammatic view similar to that of FIG. 1 illustrating the behavior of a sealing ring of the invention within a joint and subjected to compression;

FIG. 4 is a fragmentary radial cross-sectional view of a sealing ring according to the invention in a compressed in situ condition within a joint, the arrows indicating the direction of fluid pressure acting upon the sealing ring;

DESCRIPTION OF THE PREFERRED EMBODIMENTS

Figures 5A, 5B:
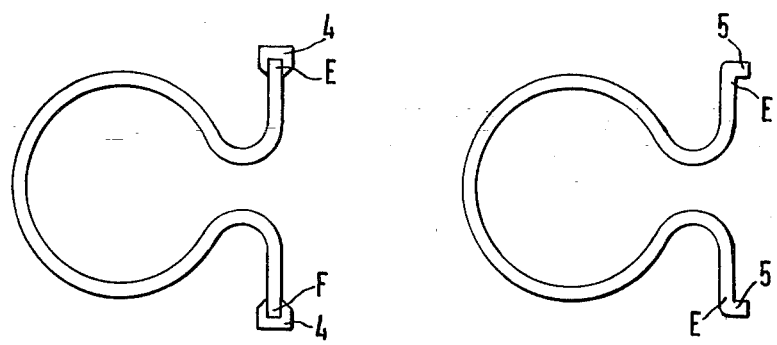
FIGS. 5(a), 5(b) and 5(c) are fragmentary radial cross-sectional views illustrating three modified sealing rings embodying the present invention and designed to provide increased sealing area at the terminal segments thereof.

Referring to the drawings, and particularly to FIG. 1 thereof, here is shown a portion of a known sealing ring 1 having a C-shaped radial cross-sectional configuration. The sealing ring is located within a recess of a first member 2 for the purpose of sealing the joint between the upper face of the first member and the lower face of an opposed second member 3. Between the first and second members there is confined a pressure zone P. The arrows T indicate the direction of application of compressive force to the members 2 and 3 which tends to move the members closer to each other by a distance 2d. The initial and final positions of sealing ring 1 are indicated respectively by full and by broken lines.

Referring further to FIG. 1, when the compressive force is applied ideally the sealing ring should be free to deform resiliently in a uniform manner throughout its entire extent. Stated differently, there should be slippage between the ring and the confining surfaces 2,3. However, this does not occur, particularly when the surfaces of members 2,3 which come into contact with the sealing ring are only roughly machined. It can thus be seen, from FIG. 1, that the ring has distorted at X and Y due to interference at Z.

Referring to FIG. 2 there is shown a radial cross-sectional configuration for a typical sealing ring embodying the concept of the present invention. As can be seen, the ring has a cross-sectional shape which can be described as being a body of revolution about a central axis, (the center being off the page of the drawing to the right) toroidal in nature taking the form (in cross-section) of a capital ($\omega$) including an arcuate central segment 6 and terminal segments 7, 8 which extend laterally from both ends of the arcuate central segment to a location beyond the peripheral extremities thereof. Such terminal segments extend away from the arcuate central segments in wing-like fashion and with an orientation which is generally parallel to a tangential plane at the midpoint of the arcuate central segment. The terminal segments terminate respectively in sealing edges E and F. The arcuate central segment 6 is resilient so as to be deformable under compression so as to exert a counter-pressure through the terminal segments when they are in engagement with the surfaces to be sealed. It will, of course, be understood that the arcuate central section and the terminal segments integral therewith are annular. In fabrication of the ring it is formed from sheet material, preferably from a single sheet of metal. It is, however, within the comtemplation of the invention to form the ring from other materials such as, by way of example only, a synthetic plastics material or a synthetic plastics material which is metal-reinforced. In all instances, however, the arcuate control segment should possess resiliency so as to be deformable under compression.

Referring further to FIG. 2, it will be observed that the arcuate central segment is C-shaped extending between A-G-B. The terminal segments 7, 8 extend respectively between C-E and D-F and are connected integrally to the C-shaped segment by transitional sections A-C and B-D. As stated earlier, the terminal segments extend laterally beyond the peripheral extremities of the arcuate central segment. Thus, the distance E-F appreciably exceeds the outside diameter of arcuate segment A-G-B measured parallel to the terminal segments 7,8. In use the members to be sealed which tend to compress or tension the ring by reducing the distance C-D act only against the sealing edges E,F.

As shown in FIG. 3, which is analogous to FIG. 1 in that it depicts the mode of behavior of the sealing ring of FIG. 2, the edges E,F are moved by members 3 and 2 respectively each by a distance d. In similar manner to that shown in FIG. 1, the positions of the sealing ring before and after compression are illustrated respectively by full and by broken lines.

As can be seen, the actual sealing of the joint between the members 3 and 2 occurs at the sealing edges E and F so that the part A-G-B has complete freedom to function resiliently as a spring so as to exert a counter-pressure through such sealing edges. It can be seen from FIG. 3, and also from FIG. 4 which shows the sealing ring in its operative position under a uniformly distributed pressure P indicated by the multiple arrows, that the position of G has not changed, i.e., it is still spaced away from the wall of the recess but that points A and B have moved towards the axis H of the C-shaped central segment as also have the points C and D. Also to be noted is that the terminal segments C-E and D-F, which are normally in alignment with each other under no stress conditions, have shifted into a position of inclination relative to one another and that no portion of A-G or B-G has, after the compression, made contact with surfaces 3 and 2 respectively. The sealing edges E and F do not move outwardly because of the hoop stress developed in the terminal segments E-C and D-F.

Referring to FIG. 2, it will be appreciated that terminal segments EC and DF may be considered to function under pressure in a manner similar to the sections of a tube. The thickness is designed in accordance with the anticipated pressure to be developed, i.e. hoop stress or strength.

The resilient coupling of the terminal segments E-C and D-F is advantageous for two reasons. Firstly, it enables the ring to adjust its position during movement of the members 2 and 3 while the ring is being compressed, and secondly it enables a perfect fluid-tight seal to be maintained between two vibrating surfaces which are in the same plane, a situation commonly found in Diesel engines.

It will be apparent from the foregoing that the sealing ring of omega-shaped radial cross-section according to the invention, provided that it is made of suitably resilient material already known for the purpose, and is used in a suitable location in which it cannot be excessively compressed, operates effectively without undergoing permanent distortion. In other words, when it ceases to be comtempressed it re-assumes the configuration and dimensions which it possessed before it was compressed. The sealing ring is therefore truly self-energizing, in the manner in which it exerts counter-pressure against the surfaces to be sealed. Because of this characteristic the sealing ring can be leak tested in a test rig before being fitted into its finally intended location. The sealing rings can also be re-tested to establish if they are suitable for re-use, without refurbishing, provided they have not been damaged.

Although the arcuate segment A-G-B of the sealing ring can be regarded as a mechanical means for supporting the terminal segments C-E and D-F, it also acts as a sealing surface intensifier through pneumatic or hydraulic servo-action due to the operation of Pascal's law because its total internal surface area as indicated by the multiple arrows of FIG. 4 so greatly exceeds the area of contact of the sealing edges E and D.

In order that sealing washers or rings may possess a high spring factor, a high temperature resistance and a high corrosion resistance, they have to be manufactured from materials which are tough and strong. This does not present a problem when the opposed surfaces to be sealed are machined to fine limits but unfortunately this is not always so. In those cases it has been the practice to use a sealing washer or ring which has its sealing faces coated with a more ductile material such as gold, silver, indium, nickel, polytetrafluorethylene, lead, rubber, etc. Such materials when compressed flow into close engagement with the rougher parts of the mating surfaces to establish a perfect seal.

One of the major problems associated with large diameter pressure vessels such as those used in nuclear power stations is in machining the sealing surfaces to a suitable high quality.

In such circumstances it can become necessary to increase the seal contact area of the sealing ring against the mating surface area. A preferred mode of accomplishing this is illustrated in FIG. 5 (a) which shows the provision of two annular caps 4 fitted to the sealing edges E and F. Each such cap is produced from solid drawn material similar to that of the ring, is cut to length, formed into a circle, butt welded, and is coated with softer material.

Figure 5C:
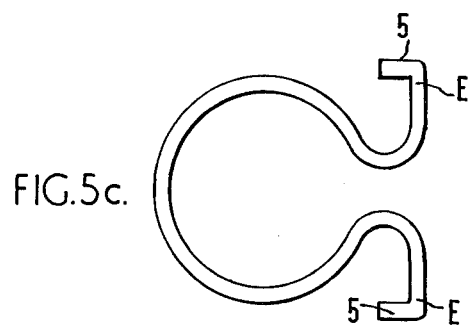

Two alternative and less expensive modes of increasing the sealing contact area of the ring are illustrated in FIGS. 5(b) and 5(c). As shown in FIG. 5(b) the edges E and F have tip extensions 5 which extend radially inwardly relative to the axis of revolution of the ring whilst as shown in FIG. 5(c) the edges E and F have tip extensions 5 which extend in a radially outward direction.

Figure 7:
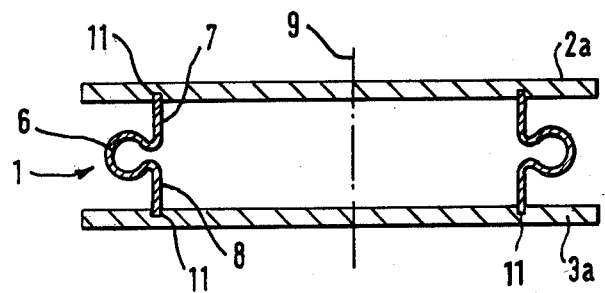
FIG. 7 is a radial cross-sectional view through a sealing ring of the present invention in sealing relation to the joint between a pair of axially spaced parallel surfaces.

Reference is now had to FIG. 7 where the sealing ring depicted in its characteristic capital omega (ᘯ) configuration is shown positioned between the surface of parallel spaced planar members 2a and 3a to be sealed. The ring, as stated previously can best be described as being a body of revolution formed about a central axis 9. The arcuate central segment 6 of the ring is toroidal and may take the precise shape of an arc of a circle. However, it is to be understood that the ring will exhibit the intended sealing characteristics even if the arcuate central segment is not a true circular arc. The critical factor is that the segment 6 should be sufficiently resilient so that it will be deformable elastically to develop the intended counter-pressure.

The terminal segments 7 and 8 extend laterally away from the central segment 6 in opposed directions and in generally parallel relation to central axis 9 as is depicted clearly in FIG. 7. The terminal segments are concentric with respect to each other. Although not required the surfaces of members 2a and 3a may be provided with grooves 11 at the locations where the outer extremities of terminal segments 7 and 8 are to be seated.

Figure 8:
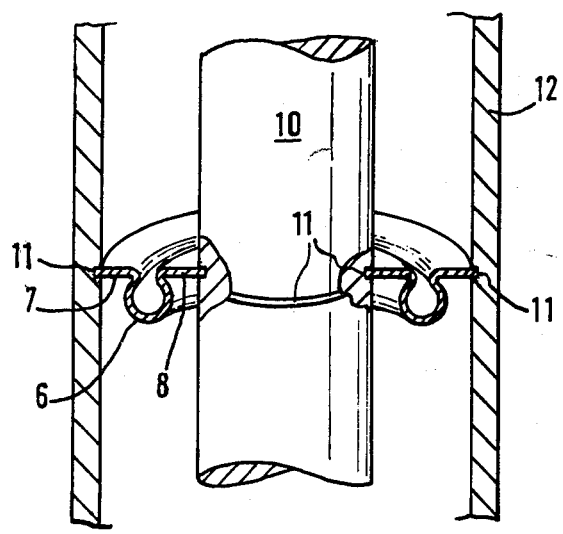
FIG. 8 is a fragmentary perspective view, partly in cross-section, illustrating a sealing ring according to the present invention sealing a shaft within a bore.

Referring to FIG. 8, the ring has been illustrated in relation to the sealing of a shaft 10 within a bore 12. As in FIG. 7, the interior surface of the bore has been given a groove 11 for seating of the outer extremity of the terminal segment 7 of the ring. However, it is within the ambit of the invention to employ the sealing ring without the need of any such groove, the unique configuration of the ring with its terminal segments 7, 8 extending generally normal to the ends of the arcuate central segment 6 developing adequate counter-pressure, when the ring is under pressure, to insure proper sealing contact of the sealing edges of the ring with the surfaces to be sealed.

In some instances, where the finish of the mating surface is of low standard for instance such as 125/140 microinch finish, springs may have to be fitted between the transitional sections A-C and B-D to impart additional counter-pressure during compression and thereby to cause the gold, silver, or whatever material coating is provided on the sealing edges to flow into these rough surfaces.

A sealing washer or ring according to the present invention is characterized by its ability to flex assisted by the pressure in the space which it is being used to seal. As such it can be used particularly effectively for sealing large diameter pressure vessels where there is a tendency for the usual sealing flanges to bend in radial directions under pressure conditions. The sealing ring can be varied both as to size and material thickness according to the degree of movement expected to take place when the ring is in use.

Figure 6:
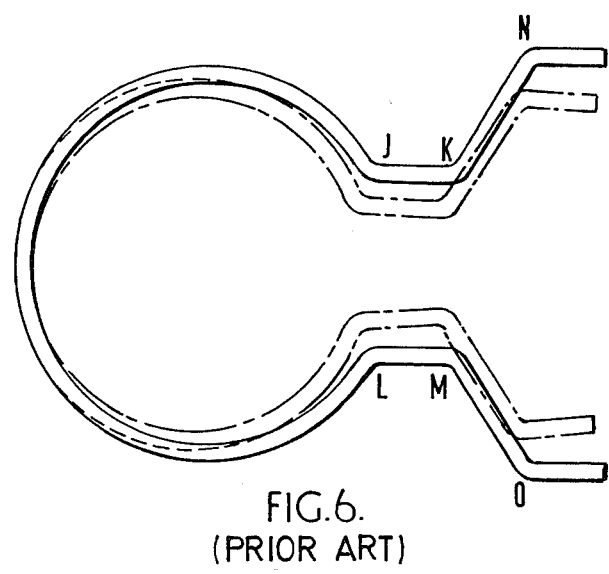
FIG. 6 is a view similar to that of FIG. 1, showing the mode of behavior of another conventional sealing ring under compression.

By way of explanation of the advantages of the sealing ring according to the invention, reference is now made to FIG. 6 which shows in radial cross-section a portion of a known and highly successful sealing ring within the ambit of U.S. Pat. No. 3,588,131 and British Pat. No. 1,213,454. This sealing ring has the disadvantage in that it is unable to form an adequate seal between roughly machined surfaces. The reason for this is firstly that unless the machined surfaces are of sufficiently high quality the resisting load or counter-pressure cannot be made sufficient to effect cold flow at the sealing edges of the ring to create the necessary seal even with the addition of coatings such as silver, gold, etc., as already mentioned. Furthermore if the knees J K and L M are allowed to come together or if springs are introduced to augment the resisting load between the knees, the legs K N and M O just simply yield to the positions shown in chain dashed lines. As this yielding occurs the points N and O slide over the mating surfaces to be sealed without establishing a leak-proof seal.

Although in the foregoing description by reference to the drawings it is suggested that the sealing ring is sealing against internal pressure, it is to be understood that the open side of the omega shape may be so positioned as to seal against an external pressure or it may be axially directed for forming a seal on a shaft as shown in FIG. 8.

Various modifications and embodiments have been shown, and other will now be apparent to those skilled in this art. Accordingly, the present disclosure is to be taken as illustrative only and not limiting of the present invention.

What is claimed is:

1. A seal ring comprising a body of revolution about a central axis, said body being in radial cross-section of capital omega (Ω) shape having a circular central segment and integral laterally extending terminal segments, the terminal segments extending in a common plane, aligned cylindrically and concentric with respect to the central axis of revolution and projecting beyond the peripheral limits of the circular segment, free ends of the terminal segments being bent to assume an orientation perpendicular to the terminal segments providing a pair of enlarged oppositely directed annular sealing edges, said circular segment being resilient and thereby deformable under pressure so as to exert a counter-pressure through the terminal segments when said sealing edges are engaged by opposed surfaces to be sealed and the ring is subjected to pressure.

2. The sealing ring according to claim 1, wherein said body is formed of sheet metal.

3. The seal ring according to claim 1 wherein said free ends of said terminal segments are bent to face toward the central axis of the body of revolution.

4. The seal ring according to claim 1 wherein the free end of said terminal segments are bent to face away from the central axis of the body of revolution.

* * * * *